(12) United States Patent
Freiler (10) Patent No.: US 6,619,497 B2
(45) Date of Patent: Sep. 16, 2003

(54) APPARATUS FOR VENTING A CONTAINER CONTAINING FLUID

(75) Inventor: John L. Freiler, Somerset, NJ (US)

(73) Assignee: Girard Equipment Co., Rohway, NJ (US)

( * ) Notice: Subject to any disclaimer, the term of this patent is extended or adjusted under 35 U.S.C. 154(b) by 118 days.

(21) Appl. No.: 09/963,238

(22) Filed: Sep. 26, 2001

(65) Prior Publication Data

US 2003/0057208 A1 Mar. 27, 2003

(51) Int. Cl.[7] ............................................... B65D 55/00
(52) U.S. Cl. ............. 220/201; 220/203.26; 220/203.28; 137/72; 137/493.5; 137/493.6
(58) Field of Search ................................. 220/201, 202, 220/203.24, 303, 203.01, 835, 203.28; 137/72, 74, 493.5, 493.6

(56) References Cited

U.S. PATENT DOCUMENTS

| | | | | |
|---|---|---|---|---|
| 1,229,885 A | * | 6/1917 | Chadwick | ................. 137/493.4 |
| 1,973,258 A | * | 9/1934 | Jensen | ................... 220/203.26 |
| 1,990,371 A | * | 2/1935 | Chadwick | ................. 137/493.5 |
| 3,127,907 A | * | 4/1964 | Novak | ..................... 137/493.6 |
| 3,153,423 A | * | 10/1964 | Biello | ..................... 137/493.5 |
| 3,385,468 A | * | 5/1968 | Fleming et al. | ................ 220/44 |
| 4,458,711 A | * | 7/1984 | Flider | ........................... 137/71 |
| 4,561,559 A | * | 12/1985 | Rutan et al. | ........... 220/203.26 |
| 5,165,445 A | * | 11/1992 | Vertanen | .................. 137/493.6 |
| 5,240,027 A | * | 8/1993 | Vertanen | ...................... 137/73 |
| 5,479,978 A | * | 1/1996 | Zenkich | .................. 137/493.3 |
| 6,145,530 A | * | 11/2000 | Fernandez | .................... 137/74 |

* cited by examiner

Primary Examiner—Stephen K. Cronin
Assistant Examiner—James Smalley
(74) Attorney, Agent, or Firm—R. Gale Rhodes, Jr.

(57) ABSTRACT

Apparatus for venting a container containing a fluid and including a poppet mounted to the bottom of a cap or flap mounted to a housing for being mounted to the container, a fastener for fastening the cap of flap to the housing and which fastener may be a fusible fastener for unfastening the cap or flap and for venting the container to the atmosphere upon heat applied externally to the container reaching a predetermined temperature. The poppet venting the container to the atmosphere upon the pressure in the container reaching a predetermined pressure and the poppet may be a combination poppet for venting the container to the atmosphere upon pressure in the container reaching a predetermined pressure and for venting the container to the atmosphere upon a vacuum in the container reaching a predetermined vacuum.

10 Claims, 12 Drawing Sheets

APPARATUS FOR VENTING A CONTAINER CONTAINING FLUID

BACKGROUND OF THE INVENTION

This invention relates to apparatus for venting a container containing fluid upon the pressure in the container reaching a predetermined pressure. This invention further relates to combination apparatus for venting a container containing fluid upon the pressure in the container reaching a predetermined pressure and upon the vacuum, or negative pressure, in the container reaching a predetermined vacuum or predetermined negative pressure. Still further, this invention relates to apparatus for venting a container containing fluid upon heat applied externally to the container reaching a predetermined temperature.

Numerous venting apparatus are known to the art for venting a tank containing a fluid. U.S. Pat. No. 3,385,468, patented May 28, 1968, R. I. Fleming, et al, inventors, entitled SAFETY VENT FOR VEHICLE TANK, discloses a safety vent for a vehicle gas tank. U.S. Pat. No. 5,168,445, patented Nov. 24, 1992, Mark W. Vertanen, inventor, and entitled RELIEF VENT APPARATUS, discloses combination pressure and vacuum relief apparatus for being mounted to a container to relieve both over pressure and under pressure in the container. U.S. Pat. No. 5,240,027, patented Aug. 31, 1993, Mark W. Vertanen, inventor, entitled COMBINATION RELIEF VENT AND CLOSURE APPARATUS, discloses an improvement in the earlier mentioned U.S. Pat. No. 5,168,445 patent and in addition to disclosing combination pressure and vacuum relief apparatus for a container, this patent also discloses fusible relief vent apparatus for venting a container in response to external heat exceeding a predetermined temperature. U.S. Pat. No. 6,145,530, patented Nov. 14, 2000, Michael A. Fernandez, inventor, entitled VENTING CAP WITH YIELDABLE PLASTIC RING, discloses a venting cap with a yieldable plastic ring for venting a tank containing a fluid which expands in response to heat applied externally to the tank upon the externally applied heat reaching a predetermined temperature.

SUMMARY OF THE INVENTION

Apparatus for venting a container containing a fluid and embodying the present invention may include a poppet mounted to the bottom of a cap or flap mounted to a housing for being mounted to the container. The apparatus may include a fastener for fastening the cap of flap to the housing and which fastener may be a fusible fastener for unfastening the cap or flap and for venting the container to the atmosphere upon heat applied externally to the container reaching a predetermined temperature. The poppet may comprise a pressure relief poppet for venting the container to the atmosphere upon the pressure in the container reaching a predetermined pressure and the poppet may be a combination poppet for venting the container to the atmosphere upon pressure in the container reaching a predetermined pressure and for venting the container to the atmosphere upon a vacuum, or negative pressure, in the container reaching a predetermined vacuum or negative pressure.

DESCRIPTION OF THE PREFERRED EMBODIMENT

Figure 1:
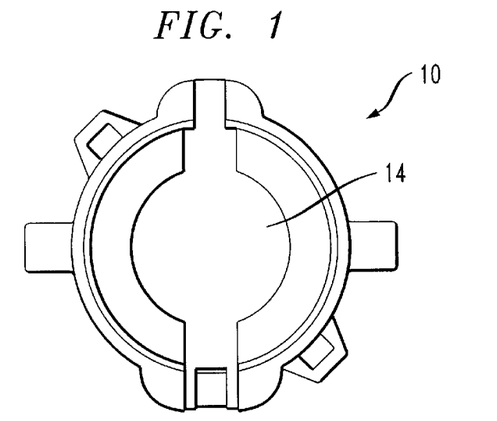
FIG. 1 is a top view of apparatus for venting a container containing fluid and embodying the present invention.
Figure 2:
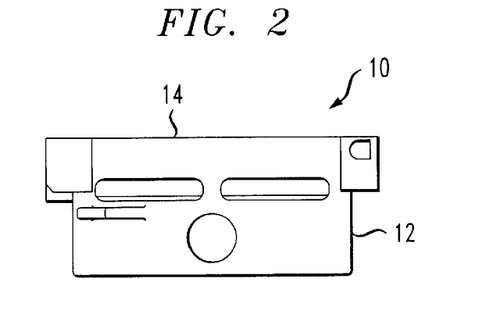
FIG. 2 is a side view of the apparatus shown in FIG. 1 with the apparatus shown in the closed position.
Figure 3:
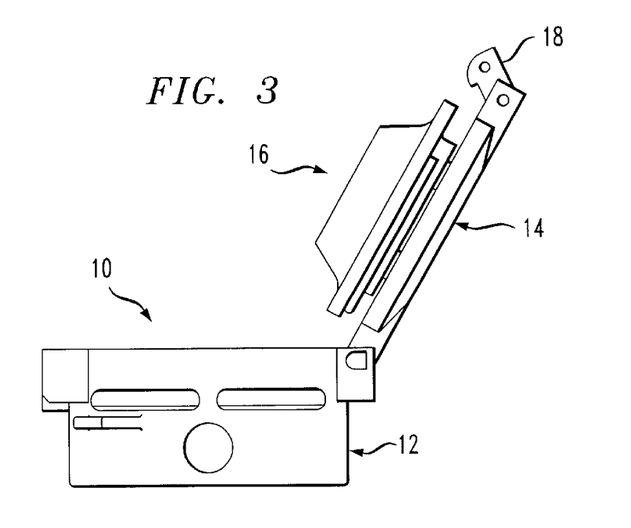
FIG. 3 is a side view of the apparatus shown in FIG. 1 with the apparatus shown in the open position.

Referring now to the drawings, and in particular to FIGS. 1–3, apparatus for venting a container having an interior containing a fluid is shown and indicated by general numerical designation 10. Apparatus 10 includes a housing indicated by general numerical designation 12, a cap or flap indicated by general numerical designation 14 and a poppet assembly indicated by general numerical designation 16 and which poppet assembly is mounted removably to the bottom of the flap 14 as described in detail below; the poppet assembly 16 provides combination pressure and vacuum venting apparatus for venting a fluid-containing container upon the pressure in the container reaching a predetermined pressure and upon the pressure in the container reaching a predetermined vacuum or negative pressure. The apparatus 10, FIG. 3, further includes a fastener or link 18 mounted pivotally to the flap 14 and for removably fastening the flap 14 to and closed over the housing 12, as also described in detail below.

Figure 4:
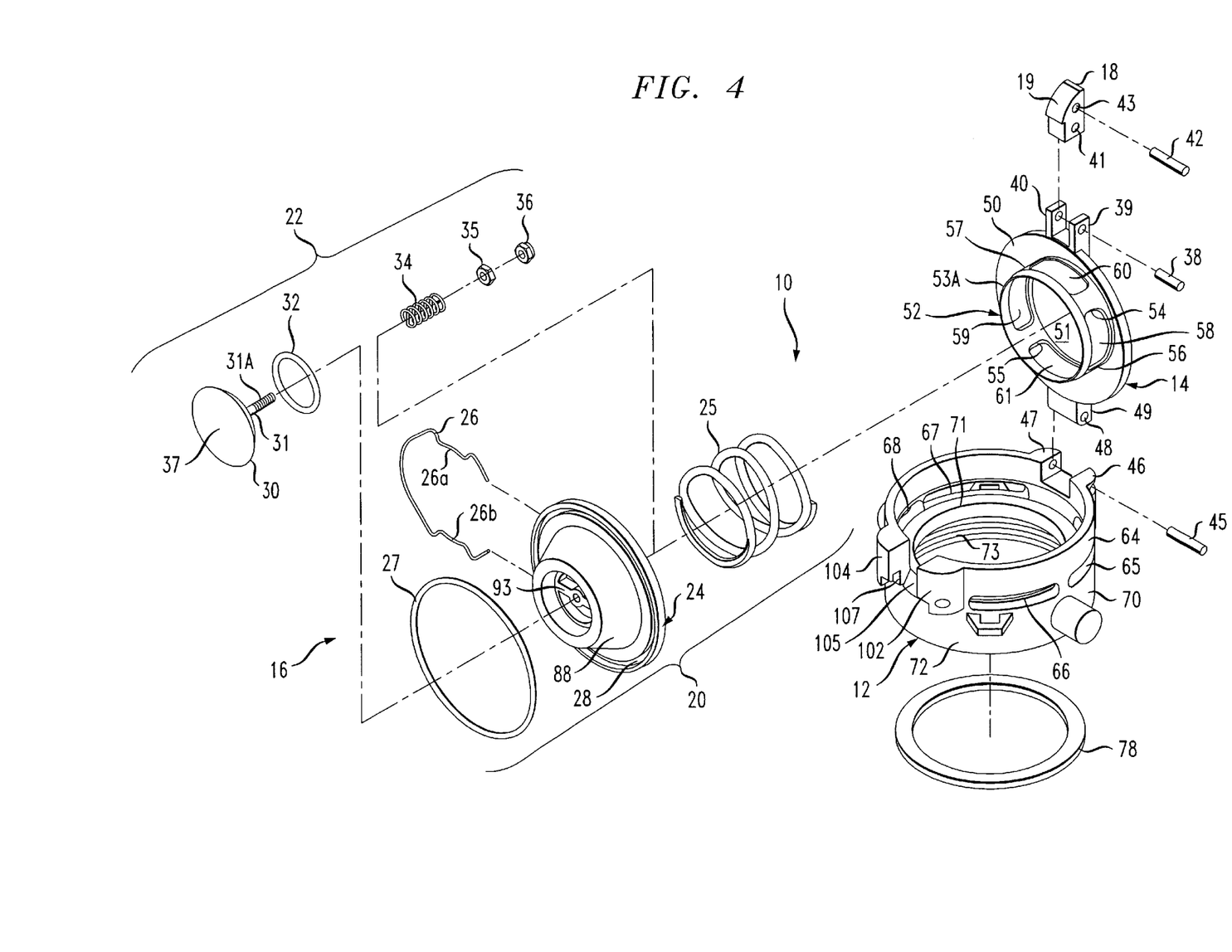
FIG. 4 is an exploded view of the elements comprising the venting apparatus of the present invention.

Referring to FIG. 4, the structures of the housing 12, flap 14, link 18 and the poppet assembly 16 are shown in detail. The poppet assembly 16 includes a pressure poppet assembly indicated by general numerical designation 20 and a vacuum poppet assembly indicated by general numerical designation 22. The pressure poppet assembly 20 includes a pressure poppet or pressure poppet member indicated by general numerical designation 24, a pressure coil spring 25, a generally U-shaped retaining spring or retaining clip 26, and a pressure O-ring 27; the retaining clip 26 includes a pair of opposed inwardly extending portions or tabs 26a and 26b. The pressure poppet 24 is provided with an inwardly extending circular channel 28 for receiving the pressure O-ring 27 in, for example, a press-fit engagement. The vacuum poppet assembly 22 includes a vacuum poppet or vacuum poppet member indicated by general numerical designation 30 provided with a stem 31 terminating in a threaded portion 31a, and vacuum O-ring 32, a vacuum coil spring 34, a vacuum nut 35 and a vacuum lock nut 36. The vacuum poppet 30 is provided with a substantially flat outer surface 37.

Referring further to FIG. 4, it will be understood that one end of the fastener or link 18 is mounted pivotally to the flap 14 by a pin 38 which extends through a pair of opposed openings formed in a pair of outwardly extending mounting members 39 and 40 provided on the flap 14 and through a hole 41 provided in the link 18; the other end of the link 18 is provided with an outwardly curved surface 19. A fastening pin 42 extends through an opening 43 formed in the link 18 and extends out either side thereof as will be noted in FIG. 17, providing outwardly extending opposed pin members 42a and 42b. The pin 42 is mounted fixedly in the hole 43 in a suitable manner known to the art. The flap 14 is mounted pivotally to the housing 12 by a pin 45 which extends through a pair of holes formed in mounting members 46 and 47 extending outwardly from the flap 14 and through a hole 48 formed in a tab 49 extending outwardly from the flap 14. Upon the pivot pins 38 and 45 extending as described, the pivot pins 38 and 45 are mounted fixedly in such holes in a suitable manner known to the art.

As will be further noted from FIG. 4, the bottom 50 of the flap 14 is provided with an integrally formed, and centrally outwardly extending generally annular mounting member or cage indicated by general numerical designation 52. The cage 52 includes an annular outer member indicated by general numerical designation 53 terminating in an outer beveled edge 53A as may be better seen in FIGS. 10–12. The cage 52 further includes two pairs of diametrically peripheral bars 54 and 55 and 56 and 57 extending perpendicularly between the annular member 53 and the bottom 50 of the flap 14. The pairs of bars 54 and 55 and 56 and 57 provide pairs of diametrically opposed peripheral openings or windows 58 and 59 and 60 and 61. The central portion of the bottom of the flap 14, inside the cage 52, provides a pressure coil spring seat 51.

Figure 20:
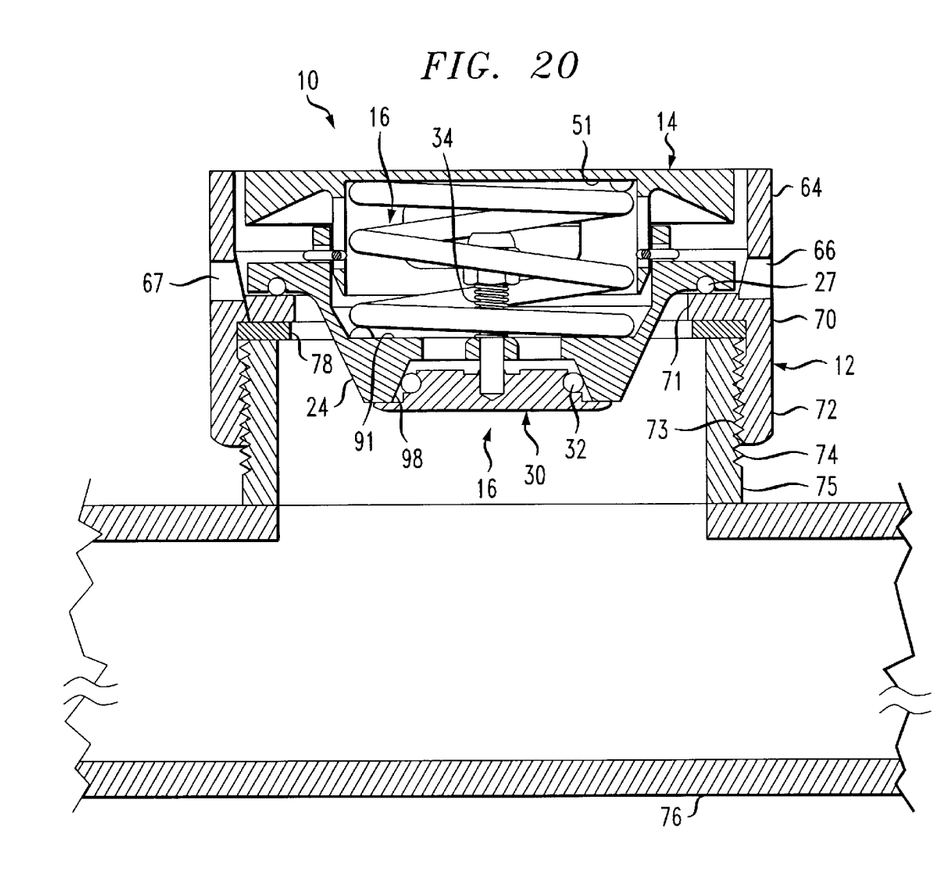
FIG. 20 is a cross-sectional elevational view of the venting apparatus of the present invention, taken generally along the line 20—20 in FIG. 20A, and showing the elements comprising the venting apparatus of the present invention in their normal or installed position on a fluid-containing container.
Figure 20A:
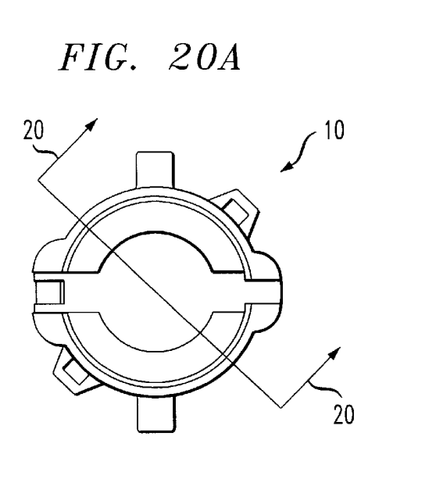

The housing 12, FIGS. 4 and 20, includes an upper portion 64 provided with a plurality of peripheral vent holes or openings 65, 66, 67 and 68, and intermediate portion 70 provided with an annular, radially inwardly extending sealing member 71 and a lower portion 72 provided with internal threads 73. As will be understood from FIG. 20, the internal threads 73 are for threadedly engaging external threads 74 provided on a nipple 75 mounted suitably, in the manner known to the art such as by welding, to a container 76 for containing a fluid. As shown in FIGS. 4 and 20, the apparatus 10 may further include an annular gasket 78 for residing between the housing sealing member 71 and the top of the nipple 75 to enhance the sealing engagement between the vent apparatus 10 of the present invention and the nipple 75.

Figures 5, 6, 7:
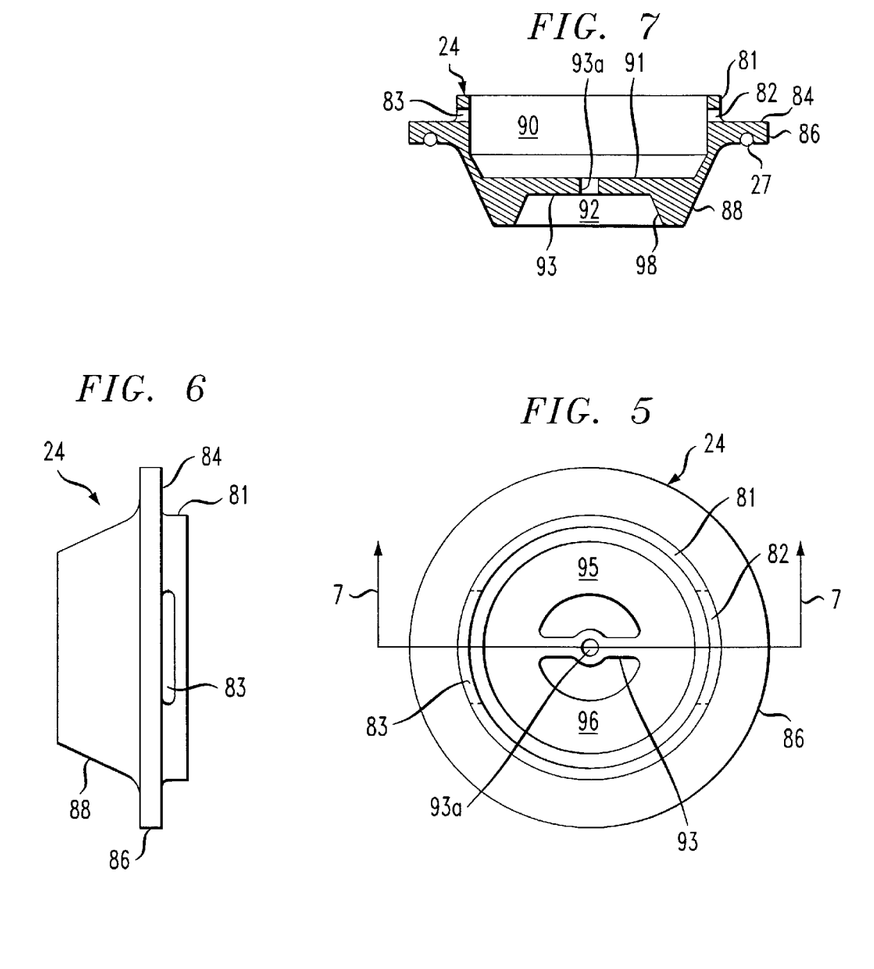
FIG. 5 is a top view of the pressure poppet.
FIG. 6 is a left side view of the pressure poppet shown in FIG. 5.
FIG. 7 is a vertical cross-sectional view of the pressure poppet shown in FIG. 5 taken generally along the line 7—7 in FIG. 5 and in the direction of the arrows.
Figure 8:
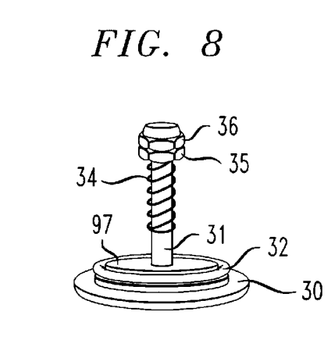
FIG. 8 is a partially diagrammatical isometric view of the vacuum poppet assembly.
Figure 9:
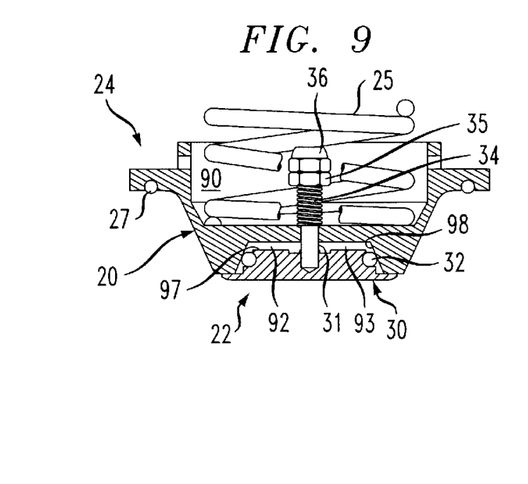
FIG. 9 is a vertical cross-sectional view of the vacuum poppet shown in FIG. 7 and additionally showing the pressure coil spring and the mounting of the poppet assembly shown in FIG. 8 to the pressure poppet.

The structure of the pressure poppet 24 is further shown in FIGS. 5–7. The pressure poppet 24 includes a generally hollow cylindrical upper portion 81 provided with a pair of diametrically opposed holes or openings 82 and 83, an intermediate portion 84 provided with an annular radially outwardly extending member 86, and a truncated conical lower portion 88 tapering inwardly. Pressure poppet 24, FIG. 7, provides an upper recess or cavity 90 and a lower recess or cavity 92. The upper cavity 90 is defined in part by a pressure coil spring seat 91 and the lower cavity is defined in part by an inwardly inclined annular sealing surface 98. The pressure poppet 24, FIGS. 5, 7 and 4, includes an intermediate interior rib 93 partially separating the upper cavity 90 and the lower cavity 92 (FIG. 7) which cavities are otherwise in fluid communication through a pair of generally semi-circular holes or openings 95 and 96 residing on either side of the rib 93 as shown in FIG. 5. The rib 93 is provided with a generally centrally formed hole or opening 93a for slidably receiving the vacuum poppet stem 31 as shown in FIG. 9. Referring to FIGS. 8 and 9, a cylindrical member or portion 97 extends upwardly from the vacuum poppet 30 and the vacuum poppet stem 31 is mounted to and extends centrally upwardly from the cylindrical member 97; as shown in FIG. 9, the lower end of the stem 31 is mounted fixedly to the cylindrical member 97 such as by swagging. The vacuum O-ring 32 is press-fitted into an inwardly extending circular channel formed in the cylindrical member 97 as shown in FIG. 9.

Figure 22:
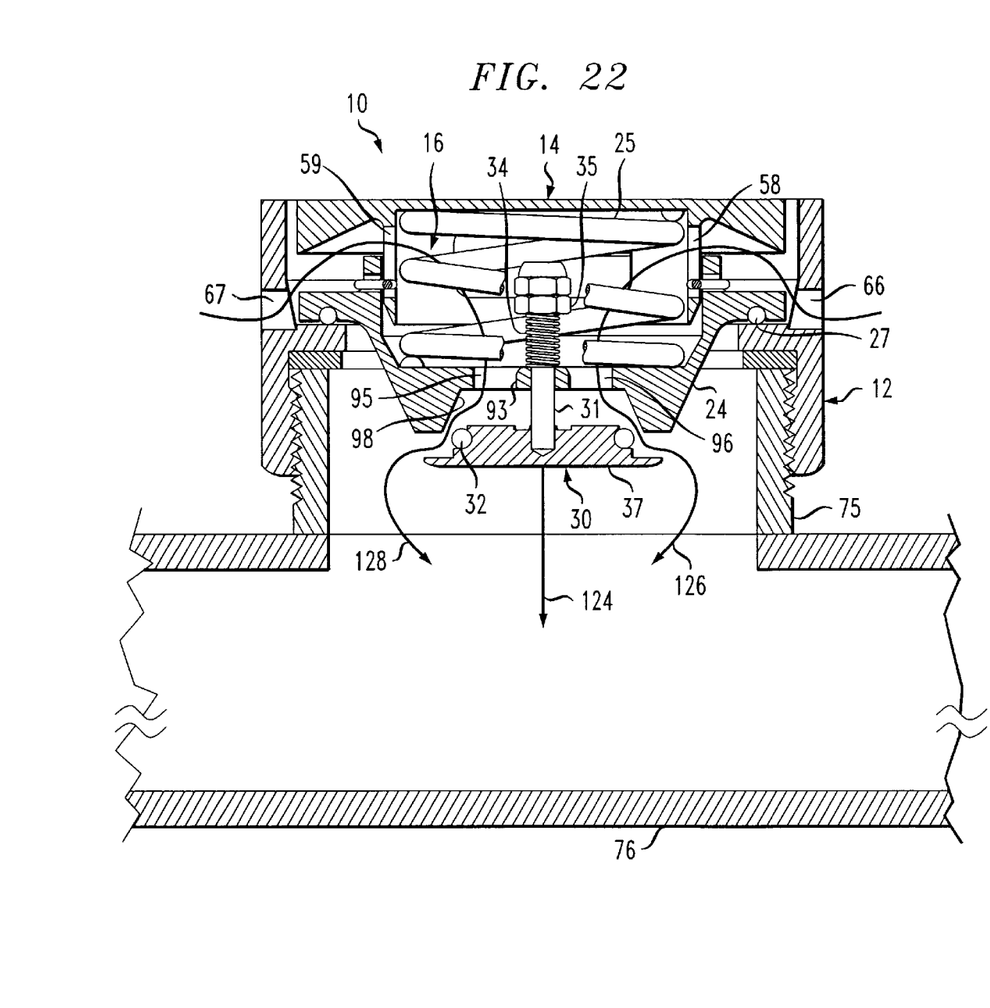
FIG. 22 is a vertical cross-sectional view taken generally along the line 22—22 in FIG. 22A which is the top view shown in FIG. 1, illustrating the vacuum relief path, or paths, provided by the venting apparatus of the present invention.
Figure 22A:
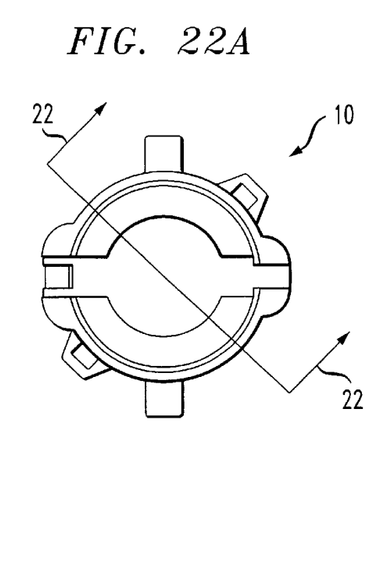

Referring further to FIG. 9, the vacuum poppet assembly 22 is assembled to the truncated conical lower portion of the pressure poppet 24 by inserting the vacuum poppet stem 31 upwardly through the hole 93a formed in the pressure poppet rib 93 after which the vacuum coil spring 32 is placed over the stem 31 in the cavity 90 and after which the vacuum nut 35 and the vacuum lock nut 36 threadedly engage the outer threaded portion 31a (FIG. 4) of the stem 31 to place and lock the vacuum coil spring 32 in compression intermediate the pressure poppet rib 93 and the vacuum nut 35. Compression of the vacuum spring 34 urges or forces the vacuum stem 31 upwardly which forces the vacuum O-ring 32 into sealing engagement with the pressure poppet sealing surface 98, FIG. 9. The vacuum stem 31 is received slidably in the pressure poppet rib 93 providing the vacuum poppet 30 with reciprocal vertical movement for vacuum relief as shown in FIG. 22 and as described below. It will be understood, and described in detail below that the stiffness and compression of the vacuum coil spring 34 generally determines the vacuum, or negative pressure, at which the venting apparatus 10 of the present invention provides vacuum venting or relief to the container 76 (FIG. 22).

Figure 10:
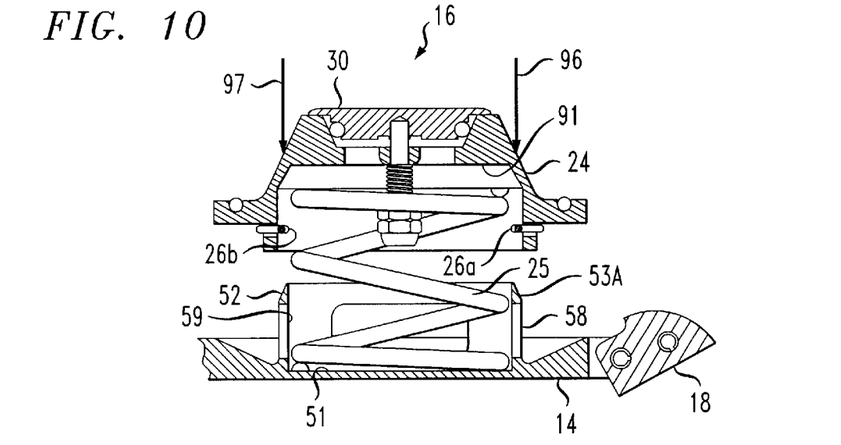
FIGS. 10–12 are sequential views, generally in vertical cross-section, illustrating the mounting of the pressure poppet assembly to the cap or flap.
Figure 11:
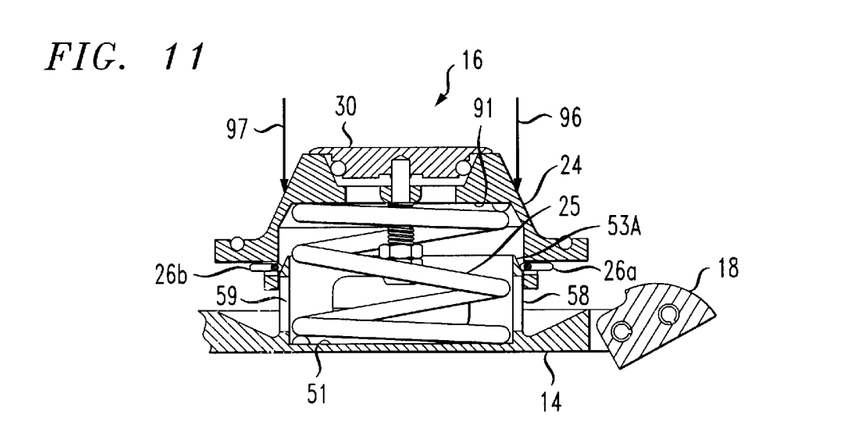
Figure 12:
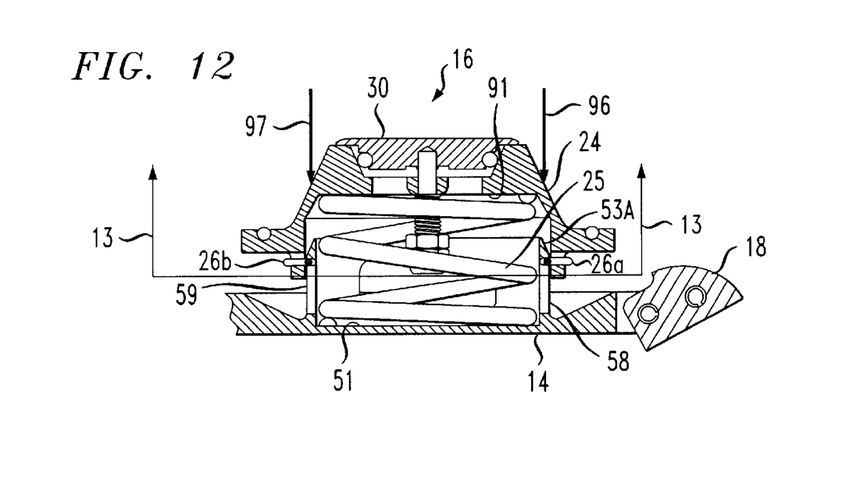
Figures 12A, 13, 14, 15:
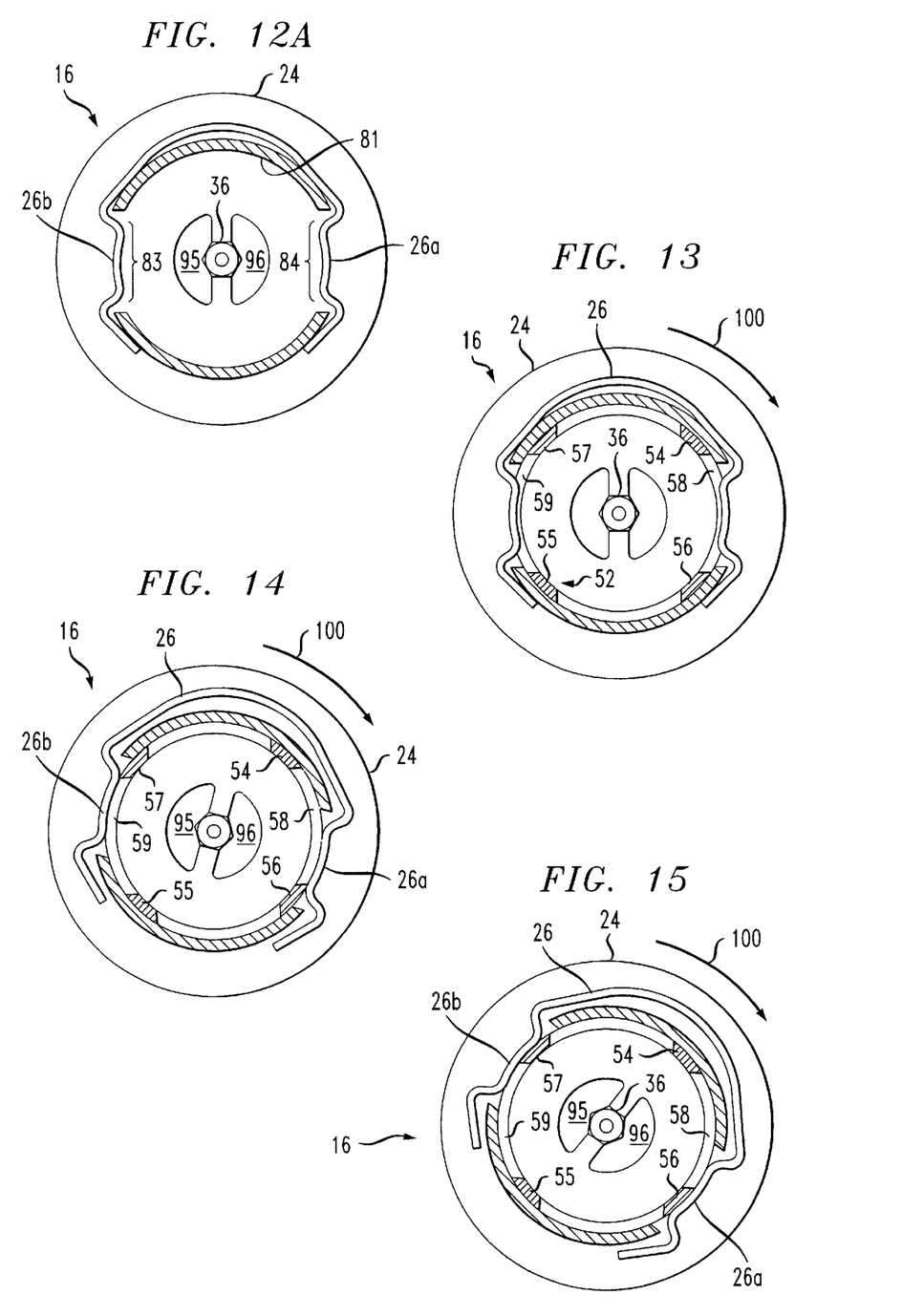
FIG. 12A is a partial cross-sectional view taken generally along the line 13—13 in FIG. 12 in the direction of the arrows but not showing the outer annular member of the cage provided on the flap.
FIGS. 13–15 are sequential views, partially in cross-section, illustrating the disassembling or removal of the pressure poppet assembly from the cap or flap. These views are taken generally along the line 13—13 in FIG. 12 in the direction of the arrows.

The removable mounting or assembly of the poppet assembly 16, specifically the pressure poppet 24, to the cage 52 provided on the bottom of the flap 14, and thereby to the flap 14, is illustrated in FIGS. 10–12 and will be described also in connection with FIGS. 4, 7, 12A and 19; preparatory to such mounting, the lower portion of the pressure coil spring is placed in the upper cavity 90 of the pressure poppet 24 as shown in FIG. 9. Referring first to FIG. 4, it will be understood that the distance between the opposed retaining clip tabs 26a and 26b is greater than the diameter of the upper hollow cylindrical portion 81 of the pressure poppet 24, FIG. 7. The retaining clip 26 is first spring mounted to the hollow cylindrical portion 81 of the pressure poppet 24 as illustrated in FIG. 12A. For such mounting, the spring clip 26 is manually forced into engagement with the hollow cylindrical portion 81 of the pressure poppet 24 expanding the opposed tabs 26a and 26b outwardly until such tabs are opposite the opposed openings 82 and 83 formed in the pressure poppet cylindrical portion 81 whereupon the opposed spring clip tabs 26a and 26b spring inwardly into, and partially through, the opposed pressure poppet openings 82 and 83 thereby spring mounting the retaining clip 26 to the hollow cylindrical portion 81 of the pressure poppet 24 as shown in FIG. 12A.

Figure 19:
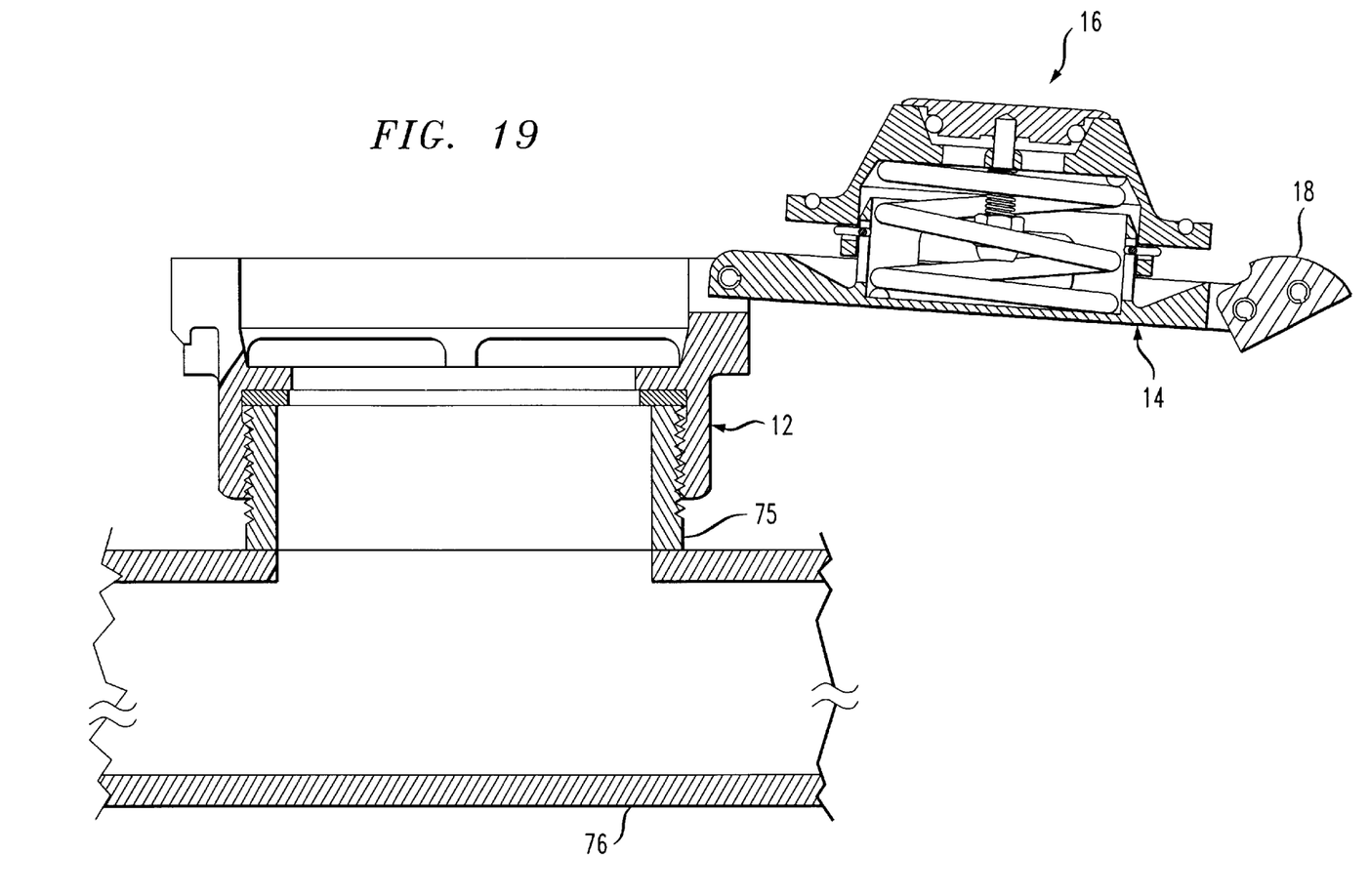
FIG. 19 is an elevational cross-sectional view illustrating the cap or flap in the fully open position for filling or servicing of the container to which the venting apparatus of the present invention is mounted.

The flap 14, FIG. 19, may be pivoted outwardly, and referring to FIG. 10, the retaining clip tabs 26a and 26b are aligned opposite either the pair of cage peripheral openings 58 and 59, or the pair of openings 60 and 61, provided in the flap cage 52 (FIG. 4); in the illustration of FIGS. 10–12 the pair of opposed cage peripheral openings 58 and 59 are used. The poppet assembly 16, particularly pressure poppet 24, is then forced downwardly manually, as indicated by the arrows 96 and 97, FIG. 10, causing the retaining clip tabs 26a and 26b to engage the outer annular beveled edge 53A of the outer annular member 53 of the cage 52, as shown in FIG. 11, which causes the retaining clip tabs 26a and 26b to expand outwardly until, as shown in FIG. 12, further downward movement of the pressure poppet 24 causes the retaining clip tabs 26a and 26b to pass over the outer annular member 53 and then contract inwardly towards each other and reside under the outer annular member 53 thereby removably spring mounting the pressure poppet 24, and thereby the poppet assembly 16, to the flap cage 52 and thereby to the flap 14. It will be understood that as the pressure poppet assembly 16 is mounted to the flap 14 the pressure coil spring 25 is compressed between the pressure coil spring engagement seat 91 of the pressure poppet 24 and the pressure coil spring seat 51 of the flap 14. It will be further understood from FIG. 12 that the diameter of the retaining clip tabs 26a and 26b is smaller than the height of the cage peripheral openings 58 and 59 and this permits the tabs 26a and 26b to move upwardly and downwardly in the cage windows 58 and 59 while maintaining the poppet valve assembly 16 spring mounted or assembled to the flap cage 52 and thereby to the flap 14. This permits the poppet assembly 16, in response to pressure acting thereagainst as described below in connection with FIG. 21, to move further toward the flap 14 thereby further compressing the pressure coil spring 25 while the retaining clip tabs 26a and 26b maintain the poppet valve assembly 16 mounted or assembled to the flap 14.

The disassembly or unmounting of the poppet assembly 16, specifically the pressure poppet 24, from the cage 52 of the flap 14, and thereby from the flap 14, is illustrated in FIGS. 13–15. As will be noted from these FIGS., the cage peripheral bars 54, 56, 55 and 57 are beveled inwardly (note the bar cross-sections) which facilitates expanding the opposed tabs 26a and 26b of the retaining clip 26 outwardly upon rotation of the poppet valve 24 with respect to the cage peripheral bars 54–57. As illustrated in FIG. 13, the pressure poppet 24 and the retaining clip 26, as indicated by the curved arrow 100, are rotated, or twisted, manually with respect to the cage peripheral bars 54–57, and thereby with respect to the flap 14 (FIG. 19), whereupon, as illustrated in FIG. 14, the retaining clip tabs 26a and 26b engage the cage peripheral bars 54–57 expanding them outwardly as shown in FIG. 14 until, upon continued rotation or twisting of the pressure poppet 24, the retaining clip tabs 26a and 26b are expanded outwardly from and until they no longer reside in the cage windows or openings 58 and 59, as shown in FIG. 15, thereby disassembling or dismounting the poppet valve 24, and thereby the poppet assembly 16, from the flap cage 52 and thereby from the flap 14. It will be understood from FIGS. 13–15 that since both edges or sides of the cage peripheral bars 54–57 are beveled inwardly, the poppet assembly 16, specifically the pressure poppet 24, can be disassembled or unmounted from the flap 14 by being rotated in either the clockwise direction as shown by the arrows in these FIGS. or by being rotated in the opposite or counterclockwise direction.

It will be understood from the above descriptions of the assembly and disassembly of the poppet assembly 16 to and from the flap 14 by the manually applied force that such assembly and disassembly can be accomplished without the use of any tools making the venting apparatus 10 of the present invention particularly useful and serviceable in the field.

Figure 16:
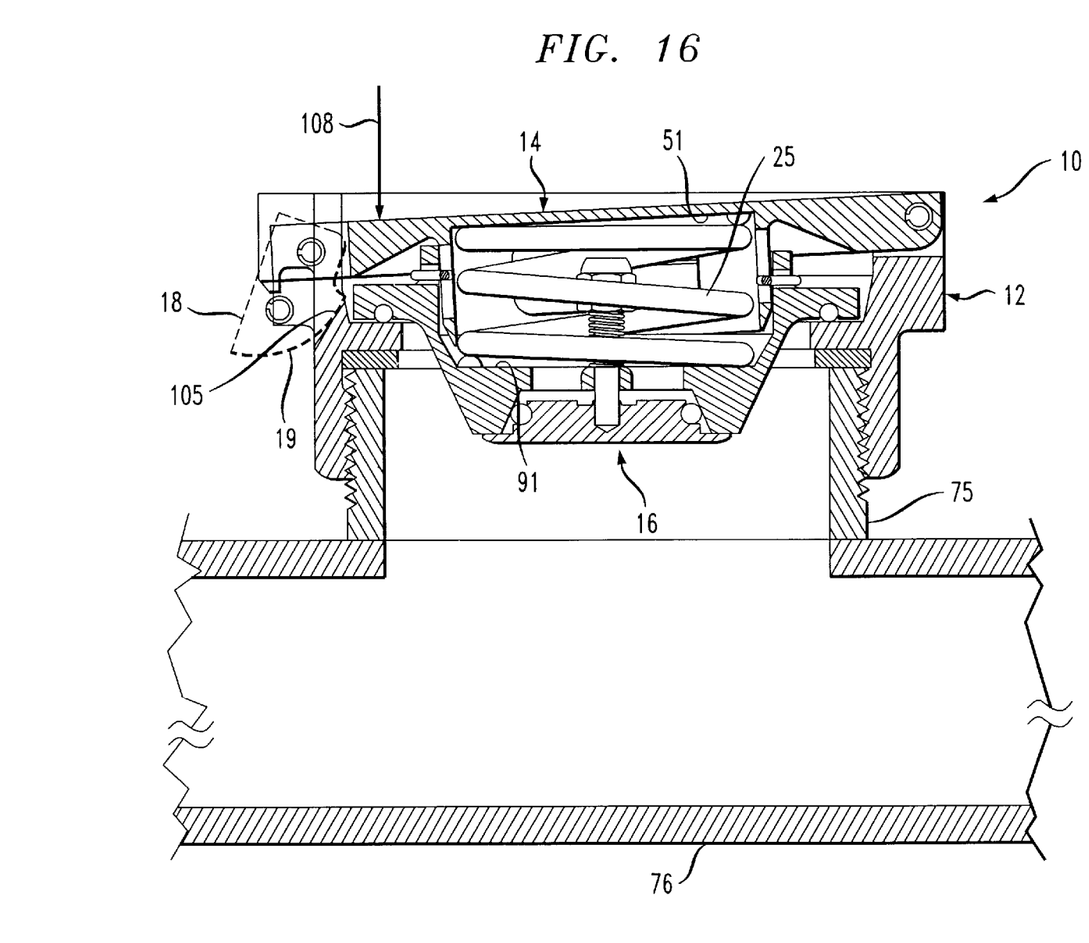
FIG. 16 is a cross-sectional elevational view illustrating both the fastening and unfastening of the cap or flap to the housing.
Figure 17:
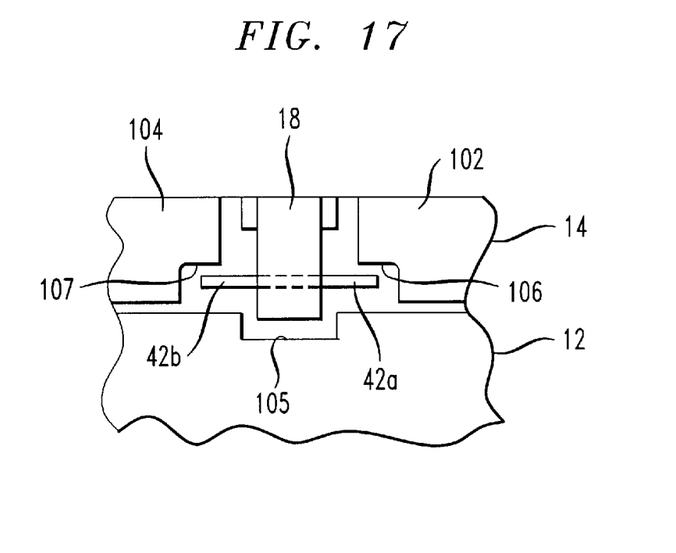
FIG. 17 is a partial front, diagrammatical illustration, of the fastener or link fastening the cap or flap to the housing.
Figure 18:
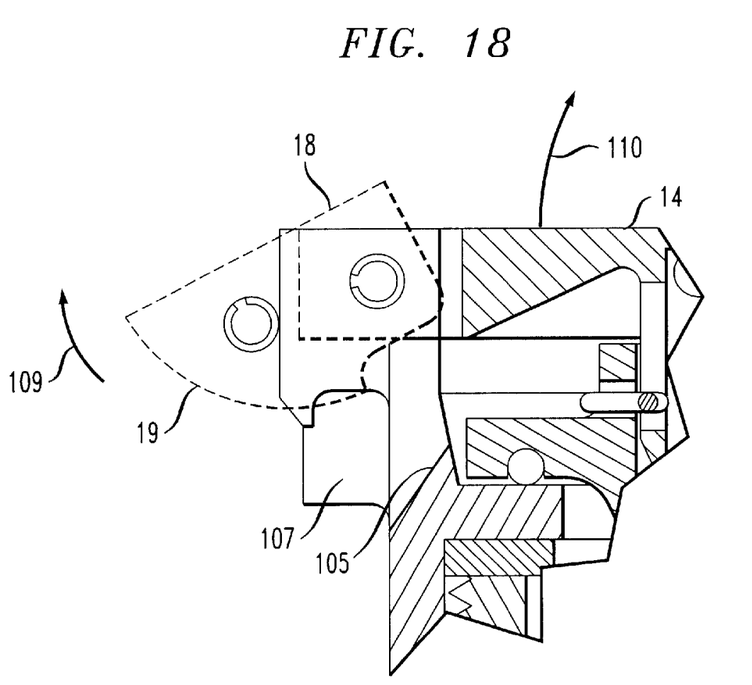
FIG. 18 is a partial view, generally in cross-section, illustrating the unfastening of the fastener or link from the housing.

Referring to FIG. 16, this FIG. illustrates both the fastening and unfastening of the flap 14 to the housing 12 by the fastener or link 18. Before describing the fastening of the flap 14 to the housing 12 by the link 18, reference is made again to FIG. 4 and to the housing 12. As shown in FIG. 4, the housing 12 is provided with a pair of integrally formed, spaced apart and outwardly extending fastening members 102 and 104 separated by an inwardly inclined ramp surface 105. The opposed fastening members 102 and 104 are provided with a pair of spaced apart, opposed, inwardly and upwardly extending slots 106 and 107, only slot 107 is shown in FIG. 4, both slots 106 and 107 are shown in FIG. 17 and slot 107 is best seen in FIG. 18. As shown in FIG. 16, upon the flap 14 being pivoted over the housing 12, manually applied downwardly acting force indicated by the arrow 108 is applied to the flap 14 which forces the fastener or link 18 downwardly until the opposed ends of the fastening pin 42 (FIG. 4) and as shown in FIG. 17, are opposite the slots 106 and 107 formed in the housing 12 whereupon the fastener or link 18 is pivoted manually inwardly toward the housing 12 causing the opposed pin members 42a and 42b to reside in the slots 106 and 107 as shown in FIG. 17. The downwardly acting force 108, FIG. 16, is removed whereupon the compressed pressure coil spring 25 acting between the pressure poppet spring support surface 91 and the flap spring support surface 51 forces the flap 14 upwardly locking the opposed ends of the members 42a and 42b in the slots 106 and 107, FIG. 17, thereby removably fastening the flap 14 to the housing 12.

To unfasten the flap 14 from the housing 12, and referring again to FIG. 16, manually applied downwardly acting force indicated by the arrow 108 is applied to the flap 14 to depress the flap 14 inwardly toward the housing 12 as shown in FIG. 16. Such depression of the flap 14 causes the fastener or link 18 to be moved downwardly and pivoted outwardly as shown in FIG. 18 by the outwardly curved link surface 19 engaging the inwardly inclined ramp surface 105 (FIG. 4) provided on the housing 12, and as indicated by the curved arrow 109 in FIG. 18. This moves the opposed link pin members 42a and 42b downwardly and pivots them outwardly and out of the slots 106 and 107, FIG. 17, thereby unfastening the link 18, and thereby the flap 14, from the housing 12 whereupon the flap 14 may be pivoted upwardly manually as indicated by the arrow 110 in FIG. 18. As shown in FIG. 19, the flap 14 may be further pivoted outwardly manually to expose the interior of the container 76 which permits the container 76 to be filled or otherwise serviced.

FIG. 20 shows the vent apparatus 10 of the present invention, and the above-described structural elements comprising the vent apparatus 10, in their positions as installed on a fluid-filled container 76 with the internal threads 76 provided on the housing 12 threadedly engaging the external threads 74 provided on the container nipple 75.

Figure 21:
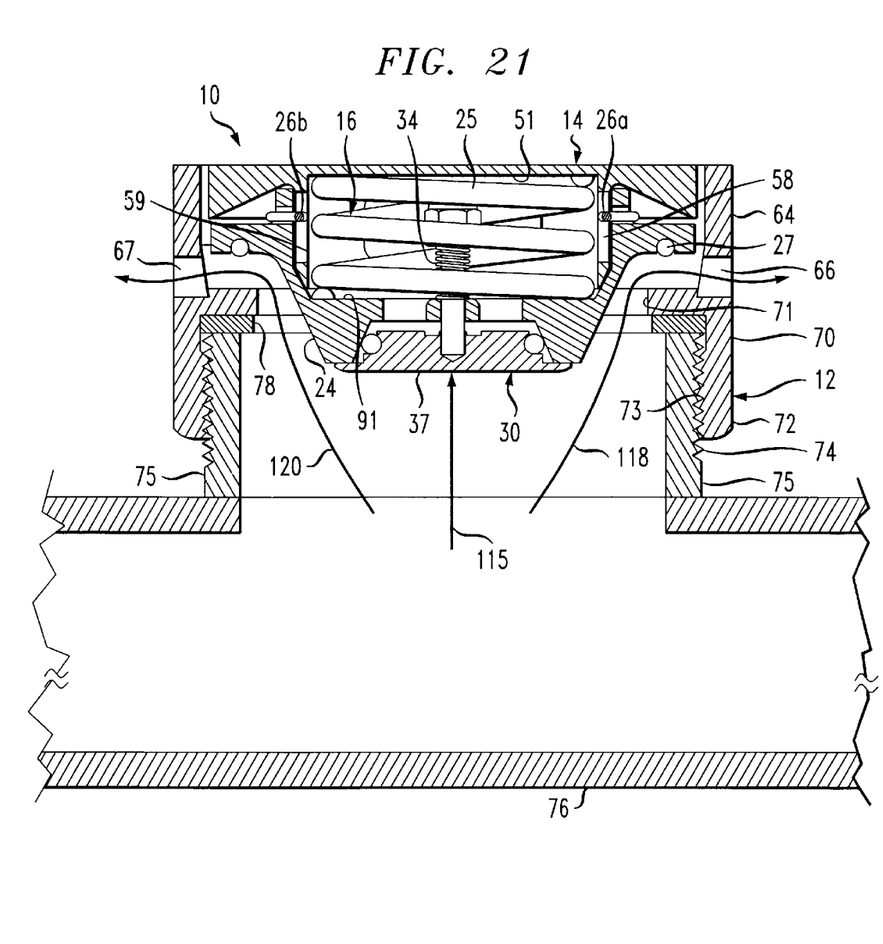
FIG. 21 is a vertical cross-sectional view, taken generally along the line 21—21 in FIG. 21A which is the top view of FIG. 1, illustrating the pressure relief path, or paths, provided by the venting apparatus of the present invention.
Figure 21A:
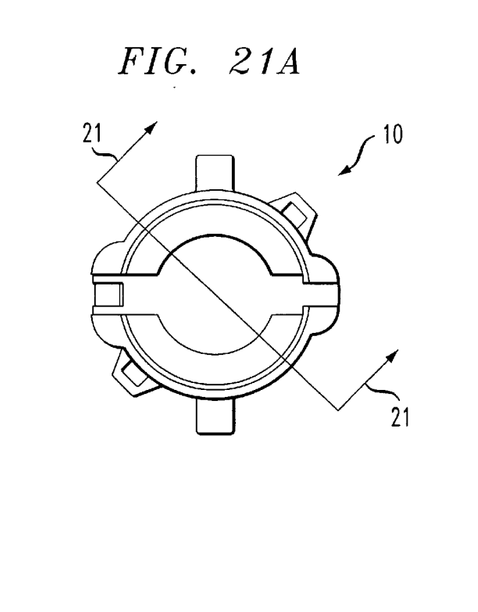

Referring now to FIG. 21, the pressure venting feature of the vent apparatus 10 of the present invention is illustrated. Upon the pressure in the fluid contained in the tank 76 reaching a predetermined pressure, sufficient upwardly acting force indicated by the arrow 115 is applied to the substantially flat outer surface 95 (FIG. 4) of the vacuum poppet 30 to force the poppet assembly 16 upwardly as shown in FIG. 21 further compressing the pressure coil spring 25 and moving the pressure O-ring 27 upwardly from and out of sealing engagement with the housing sealing member 71. This upward movement of the poppet assembly 16 exposes or vents the interior of the container 76 to the atmosphere through pressure venting paths indicated by the arrows 118 and 120 which paths extend through the space provided between the pressure O-ring 27 and the sealing member 71 and through the now exposed peripheral vent openings 66 and 67 formed in the housing 12 thereby venting the interior of the container 76 to the atmosphere; it will be understood that although not shown in FIG. 21, pressure venting paths are also established through the vent openings 65 and 68 (FIG. 4) provided in the housing 12. It will be understood that as the poppet assembly 16 is being forced upwardly by the force 115, the retaining clip tabs 26a an 26b move further upwardly in the cage openings 56 and 59 while still maintaining the poppet assembly 16, particularly the pressure poppet 24, mounted to the flap cage 52. Such pressure venting relieves the pressure, or overpressure, in the container 76. It will be understood that upon the pressure in the container 76 being reduced sufficiently, and the upwardly acting force 115 being reduced sufficiently, the compressed coil spring 25 will overcome the reduced upwardly acting force 115 forcing the poppet valve assembly 16 downwardly until the pressure O-ring 27 provided on the pressure poppet 24 again sealingly engages the sealing member 71 provided on the housing 12 thereby again sealing the interior of the container 76 from the atmosphere.

It will be understood that the predetermined pressure in the container 76 at which the poppet assembly 16 of the present invention vents the interior of the container to the atmosphere is determined primarily by the stiffness of the pressure coil spring 25 and the amount of compression applied to the pressure coil spring 25 upon the assembly of the pressure venting apparatus 16 to the flap 14 as described above in connection with FIGS. 10–12. It will be understood that the predetermined pressure at which the poppet assembly 16 of the present invention vents the interior of the container to the atmosphere may be made in accordance with industry standards and Department of Transportation (DOT) regulations 49 C.F.R. 178.705.

The vacuum relief feature of the vent apparatus 10 of the present invention is illustrated in FIG. 22. Upon a sufficient vacuum, or negative pressure, being present in the container 76, such vacuum or negative pressure being indicated by the downwardly acting arrow 124, such vacuum or negative pressure will pull the vacuum poppet 30 downwardly against the action of the vacuum coil spring 34 thereby further compressing the vacuum coil spring 34 between the vacuum nut 35 and the pressure poppet rib 93. As will be noted in FIG. 22, such downward movement of the vacuum poppet 30 moves the vacuum O-ring 32 out of sealing engagement with the annular sealing surface manually provided on the pressure poppet 24 thereby opening vacuum relief or vacuum vent paths indicated by the arrows 126 and 128 in FIG. 22. The vacuum relief path or vent 126 extends from the atmosphere through the peripheral vent hole 66 formed in the housing 12, through the cage window 58, through the interior of the coil spring 25, through the opening 96 in the pressure poppet 24 and between the annular sealing surface 98 of the pressure poppet and the vacuum O-ring 32 thereby venting the interior of the container 76 to the atmosphere. The vacuum relief path or vent 198 extends from the atmosphere through the peripheral vent hole 67 formed in the housing 12, through the cage opening 59, through the interior of the pressure coil spring 25, through the opening 95 formed in the pressure poppet 24 and through the now open space between the annular sealing surface 98 provided on the pressure poppet 24 in the vacuum O-ring 32 to the interior of the container 76; although not shown in FIG. 22, it will be understood that vacuum relief paths or vacuum vent path, are also established through housing vent holes 65 and 68 (FIG. 4) and cage holes or openings 58 and 59. It will be understood that upon the vacuum, or negative pressure, present in the container 76 reducing sufficiently, the compressed vacuum coil spring 34 will act against the pressure poppet rib 93 and the vacuum nut 35 forcing the vacuum poppet 30 upwardly causing the vacuum O-ring 32 to sealingly re-engage the pressure poppet annular sealing surface 98 thereby again sealing the interior of the container 76 from the atmosphere in combination with the pressure poppet O-ring 27.

It will be recalled as noted above that the vacuum, or negative pressure, at which the compression of the vacuum coil spring 34 is overcome is determined primarily by the stiffness of the vacuum spring 34 and the amount of compression applied to the vacuum coil spring 34 upon the assembly of the vacuum poppet to the pressure poppet 24 as shown in FIG. 9 and described above. This vacuum, or negative pressure, may be predetermined in accordance with the industry standard and Department of Transportation (DOT) regulations 49 C.F.R. 178.705.

Figure 23:
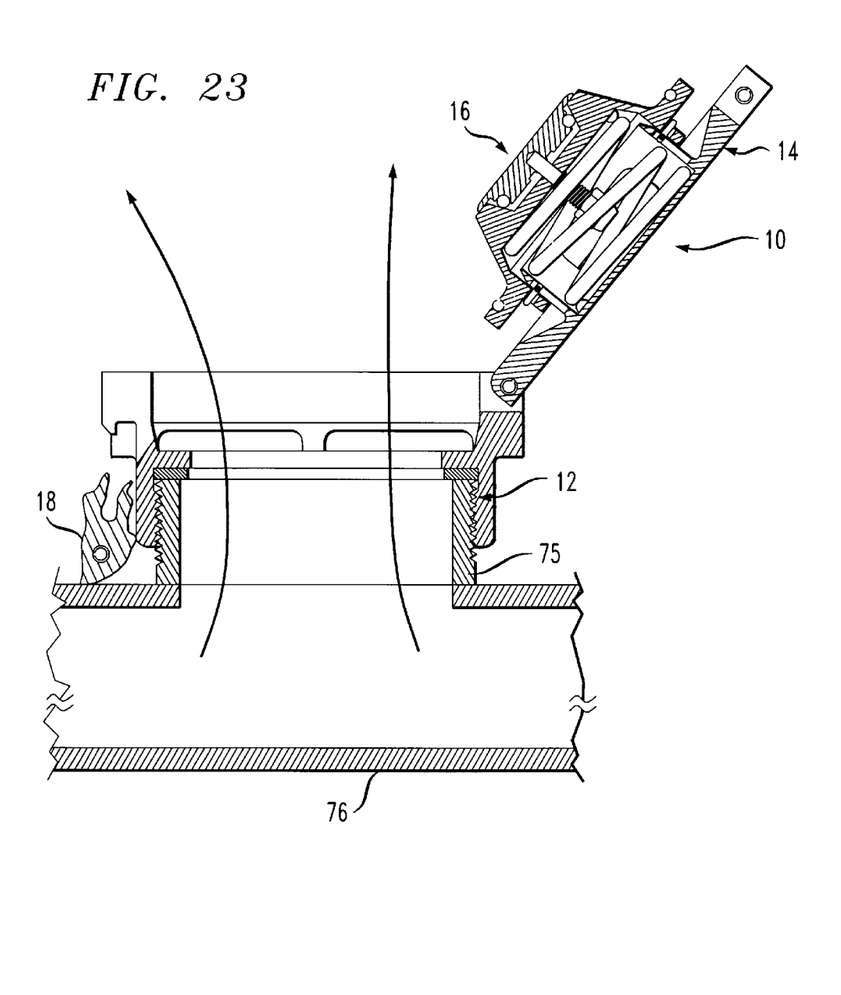
FIG. 23 is a vertical cross-sectional view of the venting apparatus of the present invention illustrating the container venting upon the container being exposed to external heat above a predetermined temperature causing the melting, or softening beyond the yield strength or load-bearing strength, of a fusible link or fastener.

Referring now to FIG. 23, the venting of the interior of the container 76 to the atmosphere upon the pressure in the container reaching a predetermined pressure due to the application of external heat is illustrated. The link or fastener 18, in this embodiment, is a fusible link and may be made, for example, of high density polyethylene having a yielding point of about 260° F. Accordingly, it will be understood that upon the fastener or link 18 being such a fusible link, that upon the external heat applied to the container reaching a temperature of about 260° F., the fusible fastener link 18 will yield, or even partially melt as shown in FIG. 23, thereby unfastening the flap 14, from the housing 12 whereupon the internal pressure present in the container 76 due to such externally applied heat will force, or blow, the flap 14 of the present invention upwardly and pivoted outwardly as shown in FIG. 23 thereby venting the interior of the container 76 to the atmosphere.

It will be further understood that in a further embodiment of the vent apparatus of the present invention, the link 18 may be non-fusible and may be made of a suitable metal, such as for example, stainless steel. Accordingly, it will be understood that the link or fastener of the present invention may be an interchangeable link or fastener made of either fusible, or non-fusible, material.

Figure 24:
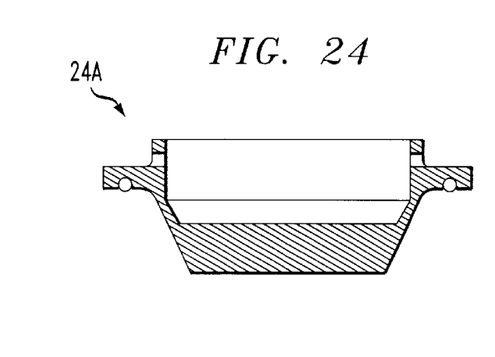
FIG. 24 is a vertical cross-sectional view of an alternate embodiment pressure poppet of the present invention for providing venting apparatus which only provides for pressure relief to a fluid-containing container.

An alternate embodiment of the vent apparatus of the present invention may provide only for pressure relief and not for vacuum relief, and in such embodiment, it will be understood that the pressure poppet will have a solid lower portion as shown in the pressure alternative embodiment 24a of FIG. 24. Upon the pressure poppet 24 being embodied in the vent apparatus of the present invention, such apparatus will function in the same manner described above with regard to the pressure venting relief feature with all of the other structural elements of the pressure venting apparatus of the present invention being and functioning the same.

The housing 12, flap 14, including the cage 52, pressure poppet 24 and vacuum poppet 30 may be cast from a suitable material, for example stainless steel, and suitably machined as required. The pressure coil spring, vacuum coil spring and gasket 78 may be suitable commercially available items and the retaining clip 26 may be made from stainless steel wire and suitably formed or bent.

It will be understood that the vent apparatus of the present invention may be utilized on mobile or stationary fluid containers such as, for example, intermediate bulk containers.

It will be understood that many variations and modifications may be made in the present invention without departing from the spirit and scope thereof.

What is claimed is:

1. Apparatus for venting a container having an interior containing a fluid, comprising:

housing means having a hollow interior, a first end, a second end and providing vent means and first fastening means, said second end for being mounted to the container;

closure means mounted pivotally to said first end of said housing means, said closure means having a top and a bottom;

second fastening means mounted to said closure means and for removably engaging said first fastening means to fasten said closure means removably to said first end of said housing means;

poppet means mounted to said bottom of said closure means, said poppet means including pressure relief means and vacuum relief means, upon said closure means being fastened to said first end of said housing means said poppet means sealingly engaging said housing means to seal the interior of the container from the atmosphere, said pressure relief means for venting the interior of the container to the atmosphere through said vent means upon the pressure in the container reaching a predetermined pressure and said vacuum relief means for venting the interior of the container to the atmosphere through said vent means upon a vacuum being present in said container below a predetermined vacuum.

2. The apparatus according to claim 1 wherein said fastening means are fusable fastening means mounted pivotally to said closure means and for yielding sufficiently upon the exterior of the container being exposed to heat above a predetermined temperature to unfasten said closure means from said housing means to permit said closure means and said poppet means to pivot away from said housing means to vent the interior of the container to the atmosphere.

3. The apparatus according to claim 1 wherein said poppet means comprise a pressure poppet, vacuum poppet, first biasing means and second biasing means, said pressure poppet mounted to said bottom of said closure means and said first biasing means mounted intermediate said pressure poppet and said bottom of said closure means, said vacuum poppet mounted to said pressure poppet and said second biasing means mounted intermediate said vacuum poppet and said pressure poppet.

4. The apparatus according to claim 3 wherein said bottom of said closure means is provided with first mounting means, wherein said pressure poppet includes a first end and a second end, wherein said pressure poppet first end comprises second mounting means for mounting said poppet removably to said closure means and for reciprocating movement toward and away therefrom; wherein said second end of said pressure poppet is a truncated conical second end terminating in an outer portion, and wherein said vacuum poppet and said second biasing means are mounted in said outer portion of said truncated conical end.

5. The apparatus according to claim 4 wherein said first mounting means comprise an annular cage extending outwardly from said bottom of said closure means, said annular cage including an outer annular member and a plurality of bars spaced apart and extending perpendicularly between said outer annular member and said bottom of said closure means and providing at least one pair of diametrically opposed cage peripheral openings, wherein said second mounting means comprise a hollow cylinder and a generally U-shaped spring clip including a pair of opposed tabs, said spring clip partially encircling said hollow cylinder with said opposed tabs inserted into and extending at least partially through said opposed openings, said hollow cylinder surrounding said annular cage with said opposed tabs inserted into said pair of opposed cage peripheral openings thereby mounting said pressure poppet removably to said cage and for reciprocal movement toward and away from said bottom of said closure means.

6. The apparatus according to claim 1 wherein said first fastening means comprise a pair of spaced apart fastening members extending outwardly from said housing means and an inwardly inclined ramp surface residing between said fastening members, said fastening members providing a pair of spaced apart inwardly and upwardly extending slots, said second fastening means comprising a link having a first end mounted pivotally to said closure means and a second end having an outwardly curved surface, said second end of said link provided with a pair of opposed and outwardly extending pin members for being received within said slots upon said closure means being pivoted toward said first end of said housing means and upon said link being pivoted inwardly between said fastening members, and upon force being applied to said closure means to force said closure means toward said housing means, said outwardly curved surface sliding along said inwardly inclined ramp surface to cam and pivot said second end of said link downwardly and outwardly with respect to said fastening members to remove said pins from said slots and unfasten said closure means from said housing means.

7. Apparatus for venting a container having an interior containing fluid, comprising:

a hollow cylindrical housing having a first end portion, a second end portion for being mounted to the container and an intermediate portion providing an internal annular housing sealing member extending into the interior of said housing, said upper portion of said housing providing housing fastening means and being provided with at least one peripheral vent hole extending through said housing;

a circular flap mounted pivotally to said first end portion of said housing, said flap having a top and a bottom, said flap provided with flap mounting means extending outwardly from said bottom of said flap;

a link mounted pivotally to said flap and for engaging said housing fastening means to removably fasten said flap to said first end portion of said housing;

pressure poppet means including a pressure poppet and a pressure coil spring, said pressure poppet including a first end portion providing pressure poppet mounting means for mounting said pressure poppet removably to said flap mounting means and for movement toward and away from said flap, said first end portion of said pressure poppet providing a cavity for receiving at least a portion of said pressure coil spring and said pressure poppet including a truncated conical lower portion, said pressure poppet including an intermediate portion providing an external outwardly extending annular member provided with pressure poppet sealing means and upon said link fastening said flap to said first end portion of said housing said pressure coil spring being compressed between said pressure poppet and said flap and forcing said pressure poppet sealing means into sealing engagement with said housing sealing member to seal the interior of the container from the atmosphere, upon the pressure in the container reaching a predetermined pressure said predetermined pressure providing sufficient force against said lower portion of said pressure poppet to move said pressure poppet toward said flap to further compress said pressure coil spring and to move said pressure poppet sealing means out of sealing engagement with said pressure housing sealing member to provide space between said pressure poppet sealing means and said housing sealing member to vent the interior of the container to the atmosphere through said space and through said peripheral vent hole.

8. The apparatus according to claim 7 wherein said flap mounting means comprise an annular cage including an outer annular member terminating outwardly in a beveled annular edge and a plurality of spaced apart barn extending perpendicularly between said annular member and said flap bottom and providing a plurality of pairs of opposed cage peripheral openings, and wherein said pressure poppet mounting means comprise a hollow cylinder provided with a pair of opposed cylinder openings and a generally U-shaped spring clip including a pair of opposed inwardly extending tabs, said spring clip partially encircling said hollow cylinder and said tabs being inserted into and at least partially through said cylinder openings, upon said hollow cylinder being forced over said annular cage said tabs engaging said beveled edge and being forced outwardly and upon further movement of said hollow cylinder over said annular cage said tabs springing inwardly into said cage through one of said pair of opposed cage peripheral openings to mount said pressure poppet removably to said flap and for movement toward and away from said flap, said tabs having a diameter and said opposed cage peripheral openings having a height and said diameter of said spring tabs being smaller than said height to permit said poppet to move toward and away from said flap while said pressure poppet remains mounted to said flap.

9. Apparatus for venting a container having an interior containing fluid, comprising:

a hollow cylindrical housing having a first end portion, a second end portion for being mounted to the container and an intermediate portion providing an internal annular housing sealing member extending into the interior of said housing, said upper portion of said housing providing housing fastening means and being provided with a plurality of peripheral vent hole extending through said housing;

a circular flap mounted pivotally to said first end portion of said housing, said flap having a top and a bottom, said flap provided with an annular cage extending outwardly from said bottom of said flap, said annular cage comprising an outer annular member terminating outwardly in a beveled annular edge and a plurality of spaced apart bars extending perpendicularly between said annular member and said flap bottom and providing a plurality of pairs of opposed cage peripheral openings;

a link mounted pivotally to said flap and for engaging said housing fastening means to removably fasten said flap to said first end portion of said housing;

poppet means including pressure poppet means and vacuum poppet means;

said pressure poppet means including a pressure poppet, a pressure coil spring, a pressure O-ring including a bottom portion and a generally U-shaped spring clip including a pair of opposed tabs, said pressure poppet including a hollow cylindrical upper portion providing a pair of diametrically opposed openings, an intermediate portion providing an external outwardly extending annular member including a lower surface provided with a circular channel for having said pressure O-ring mounted therein and an inwardly tapering truncated conical lower portion including a bottom portion, said pressure poppet provided with an inwardly extending first cavity having a bottom portion partially defining a pressure coil spring seat and an inwardly extending lower cavity extending inwardly into said lower portion of said pressure poppet and said lower cavity partially defined by an inwardly inclined annular sealing surface, the lower portion of said pressure coil spring residing in said first cavity and seated on said pressure coil spring seat, said spring clip partially surrounding said hollow cylindrical upper portion of said pressure poppet with said tabs extending into and at least partially through said pair of diametrically opposed openings, said hollow cylindrical upper portion of said pressure poppet surrounding said annular cage and said opposed tabs extending into an opposed pair of said peripheral openings to mount said pressure poppet, and thereby said poppet means, removably to said cage and thereby removably to said flap;

said vacuum poppet means including a vacuum poppet having a substantially flat outer surface, a stem, a vacuum O-ring, a vacuum coil spring and vacuum fastening means, said vacuum poppet including an upper cylindrical portion provided with an inwardly extending circular groove having said vacuum O-ring mounted therein, said stem mounted to said vacuum poppet and extending centrally upwardly from said cylindrical portion and terminating in a threaded portion, said pressure poppet including an internal diametrically disposed rib extending between said first cavity and said second cavity and providing semi-circular openings on either side thereof placing said first cavity and said second cavity in fluid communication, said rib provided with a central rib hole extending therethrough, said stem extending slidably through said rib hole and having an upper portion extending upwardly into said first cavity, said vacuum coil spring surrounding said upper portion of said stem and said vacuum fastening means mounted to said threaded portion of said stem to compress said vacuum coil spring between said rib and said vacuum fastening means to force said poppet upwardly into said second cavity and placing said vacuum O-ring in sealing engagement with said annular sealing surface;

upon said link fastening said flap to said first end portion of said housing said pressure coil spring being compressed between said pressure coil spring seat and said flap to force said pressure O-ring into seating engagement with said housing sealing member to seal the interior of the container from the atmosphere;

upon the pressure in the container reaching a predetermined pressure said predetermined pressure providing sufficient force against said substantially flat surface of said vacuum poppet to move said pressure poppet toward said flap to further compress said pressure coil spring and to move said pressure O-ring out of sealing engagement with said housing sealing member to provide pressure relief space between said pressure O-ring and said housing sealing member to vent the interior of the container to the atmosphere through said pressure relief space and through said peripheral vent holes; and upon sufficient vacuum being present in the container the vacuum pulling said vacuum poppet downwardly against the action of said vacuum coil spring thereby further compressing said vacuum coil spring and pulling said vacuum O-ring out of sealing engagement with said annular sealing surface to provide vacuum relief space between said vacuum O-ring and said annular sealing surface to vent the interior of the container to the atmosphere through said plurality of peripheral vent holes, through said cage windows, through said first cavity, through said semi-circular openings, through said second cavity and through said vacuum relief space.

10. The apparatus according to claim 9 wherein said housing fastening means comprise a pair of spaced apart fastening members extending outwardly from said housing means and an inwardly inclined ramp surface residing between said fastening members, said fastening members providing a pair of spaced apart inwardly and upwardly extending slots, said second fastening means comprising a link having a first end mounted pivotally to said closure means and a second end having an outwardly curved surface, said second end of said link provided with a pair of opposed and outwardly extending pin members for being received within said slots upon said closure means being pivoted toward said first end of said housing means and upon said link being pivoted inwardly between said fastening members, and upon force being applied to said closure means to force said closure means toward said housing means, said outwardly curved surface sliding along said inwardly inclined ramp surface to cam and pivot said second end of said link downwardly and outwardly with respect to said fastening members to remove said pins from said slots and unfasten said closure means from said housing means.

* * * * *